United States Patent [19]
Wilk

[11] Patent Number: 4,788,868
[45] Date of Patent: Dec. 6, 1988

[54] STRAIN MEASUREMENT APPARATUS AND METHOD

[75] Inventor: Leonard S. Wilk, Winchester, Mass.

[73] Assignee: The Charles Stark Draper Laboratory, Inc., Cambridge, Mass.

[21] Appl. No.: 844,622

[22] Filed: Mar. 27, 1986

[51] Int. Cl.[4] ............................................. G01N 3/08
[52] U.S. Cl. ...................................... 73/760; 73/800; 356/32
[58] Field of Search ................ 73/800, 862.65, 862.66, 73/862.67, 760, 862.32; 356/358, 32, 33, 34, 35, 35.5; 350/96.10

[56] References Cited

U.S. PATENT DOCUMENTS

| | | | |
|---|---|---|---|
| 3,599,479 | 8/1971 | Kutsay | 73/862.65 |
| 3,954,339 | 5/1976 | Atwood et al. | 356/152 |
| 4,163,397 | 8/1979 | Harmer | 73/800 |
| 4,191,470 | 3/1980 | Butter | 356/35.5 |
| 4,277,168 | 7/1981 | Oku | 356/138 |
| 4,420,251 | 12/1983 | James et al. | 356/32 |
| 4,478,093 | 10/1984 | Valadier | 73/862.65 |
| 4,579,007 | 4/1986 | Flassayer | 73/862.66 |
| 4,671,659 | 6/1987 | Rempt et al. | 73/800 X |

Primary Examiner—Jerry W. Myracle
Attorney, Agent, or Firm—Lahive & Cockfield

[57] ABSTRACT

A method and apparatus for measuring the relative movement of one end of a cylindrical member relative to the other end employs first and second strain-sensitive, parametric elements, such as optical fibers. The elements are connected to the cylindrical member being monitored along substantially the entire length of the member. An interrogation signal source applies an interrogation source signal to at least an interrogation end of each of the optical fibers and a detector or sensor measures a source signal parameter which is differentially affected by strain created due to selected movement at the one end of the cylindrical member. Circuitry is provided for determining, from its effect upon the signal source, the amount and direction of movement of the end of the cylindrical member relative to a reference standard. In particular, interfermetric measurement criteria are employed for determining the relative movement of the ends of the cylindrical member.

32 Claims, 3 Drawing Sheets

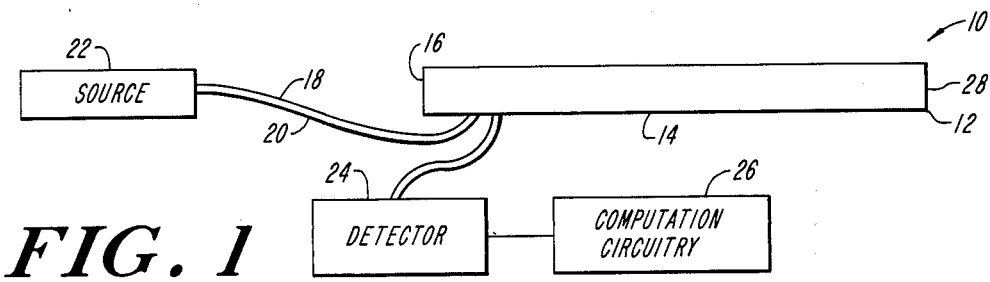
FIG. 1
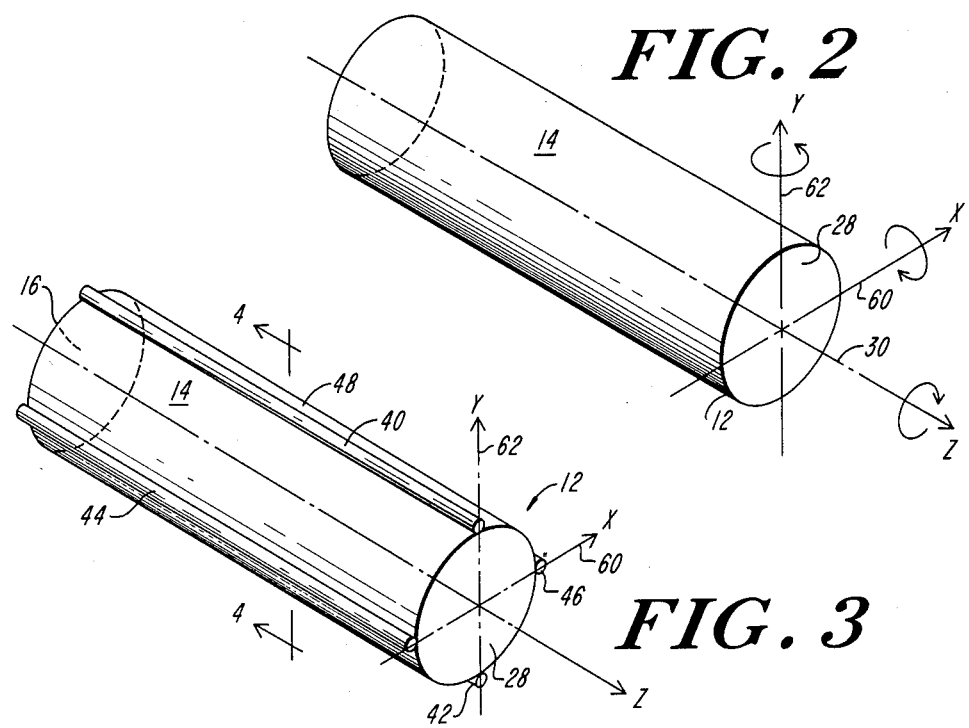
FIG. 2
FIG. 3
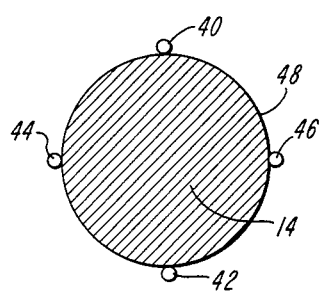
FIG. 4
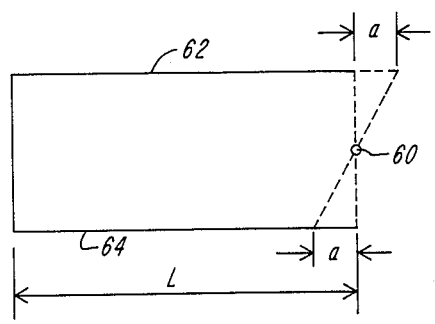
FIG. 5

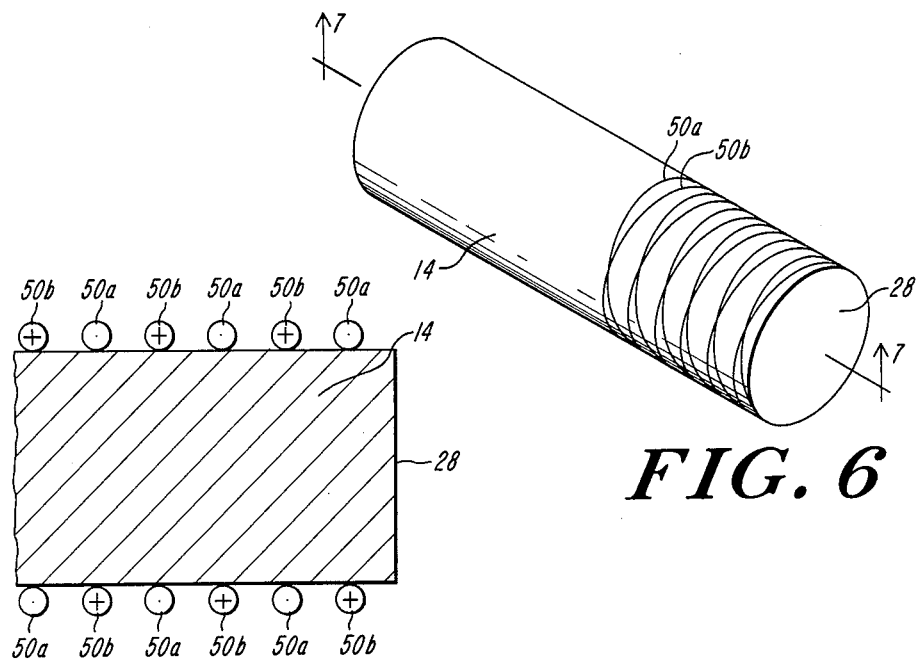
FIG. 6
FIG. 7
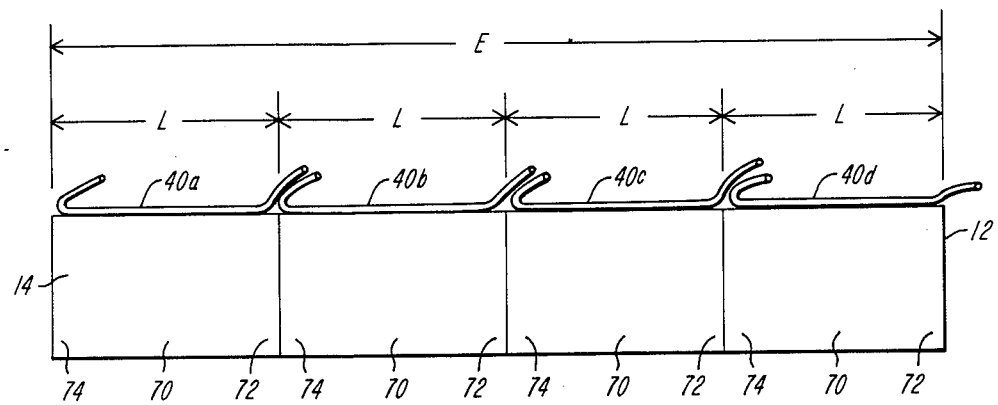
FIG. 8

STRAIN MEASUREMENT APPARATUS AND METHOD

BACKGROUND OF THE INVENTION

The invention relates generally to measuring apparatus and methods and in particular to a precision measuring apparatus and method for monitoring rotational and translational movement of one end of an deformable cylindrical member relative to the other end of the member.

Many measurement apparatus and methods can be employed for precisely measuring the relative position of the end of a generally cylindrical member. These methods and apparatus typically employ mechanical measurement techniques or invasive measurement apparatus and typically measure only a limited number of the degrees of freedom associated with the end of the member. For example, precision measurements are often made using electrical meters and gravity measurement devices, or can employ precisely aligned optical equipment.

One useful application for such measurement apparatus and methods can be, for example, in determining the direction of movement of tubing or drill elements in a slant oil well drilling operation. Another application can be to determine the precise initial conditions for a missile guidance system.

Accordingly, it is an object of the invention to provide high reliability precision measurement of one end of an cylindrical member relative to the other end thereof which is substantially stable and relatively insensitive to external environmental conditions, which is not an invasive form of measurement, and which can be employed in rugged and hostile environments.

SUMMARY OF THE INVENTION

In its broadest form, the invention relates to an apparatus and method for measuring the relative movement of one end of a cylindrical member. The term cylindrical member, as used herein, refers to a deformable rod-like member which may have a generally circular, or other shaped cross-section. Typically, although not necessarily, the cylindrical member has a length which is relatively long compared to the maximum diameter at its cross-section, and thus may be referred to as "elongated." The apparatus features a first strain-sensitive parametric element, a second strain-sensitive parametric element, connecting material for adhering at least one of the parametric elements along substantially the length of the cylindrical member, an interrogation device for applying an interrogating source signal to at least an interrogation end of each of the first and second parametric elements, a detector or sensor for measuring a source signal parameter differentially affected by strain created by a selected movement at the one end of the cylindrical member, and equipment for determining, from the source signal parameter measurement, the movement of the one end of the cylindrical member, relative to its other end, in at least one degree of freedom. The first and second parametric elements may be, for example, elongated elements, such as optical fibers.

In a particular aspect of the invention, the first and second parametric elements are each optical fibers. The interrogation device is then a laser source having optical capability for directing the laser output onto the interrogation ends of each of the first and second optical fibers. The detector or sensor then measures an optical interference pattern resulting from light emanating from an exit end of each of the optical fibers. In accordance with various embodiments of the invention, the optical fibers can be affixed along the length and on the surface of the cylindrical member at the intersection of mutually normal planes passing through the longitudinal axis of the cylindrical member and the surface of the cylindrical member. This configuration allows for measurement of relative rotation about an X or Y axis as noted hereinafter. For measurement of relative rotation about a Z axis, the longitudinal axis of the cylindrical member, the apparatus provides for adhering first and second optical fibers in a helical, counter-wound relationship to one another about the surface of the cylindrical member and for measuring the rotation of the end of the cylindrical member about the longitudinal axis of the member.

In other embodiments of the invention, the apparatus can measure translational movement of one end of the cylindrical member relative to the other by, for example, adhering continuous, diametrically zigzagging, single mode optical fibers on an inside surface of the cylindrical member whereby the optical fibers define, preferably, sections of uniform length. In this embodiment of the invention, the cylindrical member is hollow. The use of a hollow cylindrical member also allows for a construction wherein longitudinally directed, linearly arranged, optical fibers can be employed within the hollow cylindrical structure for protection from external environmental forces which may impinge upon the cylindrical member.

In another aspect of the invention, the method for measuring the relative movement of one end of a cylindrical member features the steps of adhering at least one of a first and a second strain-sensitive parametric element along the length of the cylindrical member; applying an interrogating source signal at at least an interrogation end of each of the first and second elongated parametric elements; measuring a source signal parameter differentially affected by a selected movement of the one end of the cylindrical member; and determining from the measured source parameter, the relative movement of the end in at least one degree of freedom.

In various other aspects, the method features steps for measuring each of the six degrees of freedom available to the end of the cylindrical member. In particular, the method employs fiber optic technology and enables the measurement of fiber lengths which are differentially affected by strain upon the cylindrical member.

BRIEF DESCRIPTION OF THE DRAWINGS

Other objects, features, and advantages of the invention will appear from the following description taken together with the drawings in which:

FIG. 1 is a schematic representation of a measurement system in accordance with a preferred embodiment of the invention;

FIG. 2 is a schematic representation of the degrees of freedom in a measurement apparatus in accordance with a preferred embodiment of the invention;

FIG. 3 is a schematic representation of an X and Y rotation measurement apparatus in accordance with a preferred embodiment of the invention;

FIG. 4 is a cross-sectional view along lines 4—4 of FIG. 3;

FIG. 5 is a schematic representation showing the elongation and shortening of an optical fiber element in accordance with a preferred embodiment of the X and Y rotation measurement system;

FIG. 6 is a schematic representation of a Z axis rotation measurement apparatus in accordance with a preferred embodiment of the invention;

FIG. 7 is a cross-sectional view along lines 7—7 of FIG. 6;

FIG. 8 is a schematic representation of an X or Y translation measurement system in accordance with one illustrated embodiment of the invention;

DESCRIPTION OF PARTICULAR PREFERRED EMBODIMENTS

Figure 7A:
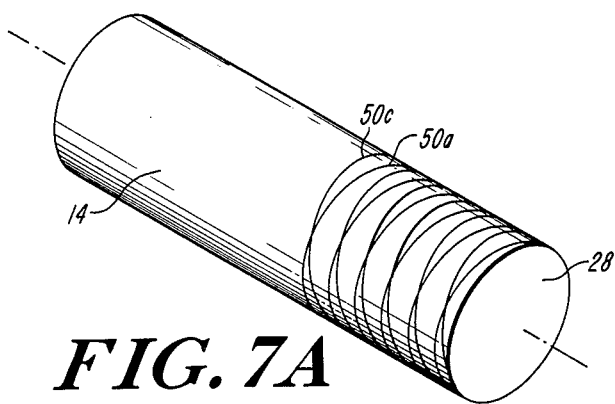
FIG. 7A is a schematic representation of a Z axis translation measurement apparatus according to a preferred embodiment of the invention.

Referring to FIG. 1, a measurement system 10 provides for measuring the differential movement of one end 12 of a cylindrical or rod-like elongated member 14 relative to a reference, typically, the other end 16 of the cylindrical member. The apparatus provides for adhering at least a first and a second elongated, strain-sensitive, parametric element 18 and 20 to the cylindrical member along at least a portion of its length as described in more detail below. An interrogating source signal from a source element 22 is directed and applied at least to an interrogation end of each of the first and second elongated members 18 and 20. That source signal is typically detected and measured by a detector 24. Detector 24 can be, for example, an apparatus for measuring an optical interference pattern when the elements 18 and 20 are optical fibers and the source 22 is a laser source of coherent monochromatic light. The measured source signal parameters can be applied to a computational circuitry 26, for example a microprocessor based electrical circuitry, for determining from the source parameters, the differential movement of end 12 relative to the reference.

The strain-sensitive parametric elements 18 and 20 can be any of a number of elongated members. The primary requirement is that each of the elements has a property, which changes under strain due to tension, or compression. That property must then affect one or more measureable parameters of the elements. Thus, for an optical fiber, the propagation velocity and length change under strain. Other elements can be constructed, for example, from a metallic conductor which, under strain, exhibits a resistivity change. Accordingly, different parametric materials can be employed as desired.

Referring to FIG. 2, the end 12 of cylindrical member 14 has a face 28 which can move in six degrees of freedom relative to the end 16. The face 28 can rotate about orthogonal X and Y axes 60 and 62, respectively, which in the illustrated embodiment, define a plane coincident with the face 28 of the member 14. The face 28 can further rotate about a longitudinal Z-axis 30 of the cylindrical member. In addition, the face can translate in the X, Y, and Z directions. For small motions, each of these six degrees of freedom is independent of each other degree of freedom.

Measurement of Rotation About the X and Y Axes

Referring now to FIG. 3, rotation of the end 12 about the X and Y axes can be accurately measured by adhering to the outside surface of the cylindrical rod, in the illustrated embodiment of the invention, fiber optic elements 40, 42 and 44, 46. The fibers can be adhered, for example, using epoxy so that they move with and are subject to the same strain as the adjacent surface of the cylindrical member. Fibers 40 and 42 are adhered to the cylindrical member 14 at the intersection of a plane defined by the Y and Z axes and the outer surface 48 of the member 14. Similarly, fibers 44 and 46 are adhered to the outside surface of the cylindrical member 14 at the intersection of a plane, defined by the X and Z axes, and the surface 48 of the cylindrical member 14. In accordance with this illustrated embodiment of the invention, as face 28 of cylindrical member 14 rotates about the X axis, for example, one of fibers 40 and 42 will be lengthened while the other fiber will be shortened. This is illustrated schematically in FIG. 5 where the extent of the change in length is exaggerated for illustration purposes, and is equal to "a". The entire length of the cylindrical member is equal to a length L.

Thus, when the cylindrical member is not deformed, the configuration of FIG. 3 provides for optical fibers of equal length. The optical fibers are doubly sensed interfermetrically by detector 24 so that one sensor indicates constructive interference while a second sensor is oriented one-quarter of a wavelength toward destructive interference. Double sensing permits a measure not only of the difference in length of the fibers but also provides a measurement as to which fiber is longer. The sensors employed in detector 24 include fringe counters. Thus, so long as the rotation about, for example, the X axis remains within the elastic limit of the fibers, that is, so long as the motions to be considered herein are small, a determination can be made of the amount of rotation about the X axis by measuring the relative change in optic fiber length.

In the description which follows, it is assumed that each fiber begins at one end and terminates at the end of the cylindrical member (or a section thereof as described below in connection with FIG. 8). In an actual design, however, one can make several passes along the length of the cylindrical member to increase sensitivity and provide a more practical physical structure and configuration. In this way, the ends of the optical fiber or other parametric element can begin and end at either end of the cylindrical member.

Referring again to FIG. 5, when rotation occurs about the X axis 60, one fiber, for example fiber 62, lengthens by an amount equal to "a" while the other fiber, fiber 64, shortens by an amount equal to "a." This occurs regardless of whether the rotation occurs at the face alone or whether the rotation occurs by bending anywhere along the length of the cylindrical member. Accordingly, for small rotational angles, and for a diameter, "d", of the cylindrical member, the amount of rotation "$\theta$" can be expressed as follows:

$$\theta = 2a/d \qquad \text{(Equation 1)}$$

When one measures this difference interfermetrically, the number of fringes "N" will be related to the wavelength "w" of the illumination in the fiber and to "a" as follows:

$$N = 2a/w \quad \text{(Equation 2)}$$

Hence:

$$\theta = Nw/d \quad \text{(Equation 3)}$$

Similarly, the second pair of optical fibers 44 and 46 can be employed for measuring rotation about the Y axis 62. The second fiber pair, in the illustrated embodiment, are thus displaced at 90° from the first pair of fibers.

The fibers 40, 42, 44, 46 could also, if the cylindrical member were hollow (as described in connection with the configuration illustrated in FIGS. 8, 9, and 10) be placed on an inside surface of the cylindrical member. Thus, referring to FIG. 10, fibers 40a, 42a, 44a, and 46a are adhered to an inside surface 48a of a hollow cylindrical member 14a. In all other respects, the analysis and operation of the measurement system corresponds to the apparatus of FIGS. 3, 4, and 5. By placing the fiber elements on the inside of the cylinder, however, extra protection from an otherwise hostile environment can be obtained.

Measurement of Rotation About the Z Axis

Referring now to FIGS. 6 and 7, according to the illustrated embodiment, a pair of single mode optical fibers 50a, 50b are adhered to the outside surface of the cylindrical member 14 so that they wrap around the surface in a flat counter-wound helix configuration; that is, the fibers wrap around the cylinder so that one fiber 50a is wound clockwise while the other fiber 50b is wound counterclockwise. For a small relative rotation "$\theta$" of one face or end of the cylindrical member 14 about the Z axis, where the fibers wrap around the cylindrical member with many turns per unit length, where the unit length equals the diameter of the cylindrical member, the change in length, "a", of a fiber is given, to first order, by:

$$\theta = 2a/d \quad \text{(Equation 4)}$$

The accuracy of this expression increases with the "flatness" (turns per linear distance) of the helix. In terms of the number of fringes N measured by the detector 24, Equation 4 can be rewritten as:

$$\theta = Nw/d \quad \text{(Equation 5)}$$

Measurement of Translation in the Z (axial) Direction

The measurement of translation of cylindrical member 14, at end 12, in the X, Y, or Z directions, in accordance with the illustrated embodiment of the invention, requires the use of an elongated reference standard (an optical fiber in the illustrated embodiment of the invention), whose length does not change. While a fixed length single mode optical fiber, which is not in contact with the cylindrical member, can be employed, it is better to note that for the helical structure of FIG. 6, the pair of counterwound flat helical fibers have a total length which is unchanged, to first order, due to small rotations or translations of the end of the cylindrical member. Those two counter-wound fibers can thereby be used together as a reference path for comparison with a pair, for example, of diametrical fibers not having a helical twist. This permits a measurement of the relative displacement of one end of the cylindrical member in the axial Z direction by interferometry.

In the description which follows, it is assumed that a cylindrical member 14 has adhered thereto the fiber structure shown in both FIGS. 3 and 7A. The fiber structure of FIG. 7A consists of one continuous fiber from end 16 to end 28 and back to end 16; between ends 16 and 28, two connected fiber sections 50c and 50d are wound in opposite directions. In the fiber structure of FIG. 3, a pair of fibers 40 and 42, and the pair of fibers 44 and 46 are each double length fibers, that is, each is a continuous fiber which translates back and forth across the surface of the cylinder from end 16 to end 28 and back to end 16, so that each represent a total length equal to 2L. The double length fibers can be compared interferometrically. Alternatively, fibers 40 and 42 could be constructed from a simple fiber extending from end 16 to end 28 and back to end 16. Fibers 44 and 46 may be similarly constructed. For all of these configurations, a fiber length difference "a" due to a displacement in the axial direction equal to "z" causes a difference "a" in the fiber length so that:

$$a = 2z \quad \text{(Equation 6)}$$

In terms of the number of interference fringes, N, we have:

$$Z = Nw/2 \quad \text{(Equation 7)}$$

Translation in the X and Y Directions

For determining the relative translation of end 12 of member 14 in the X and Y directions, referring to the side elevation view of FIG. 8, the cylindrical member is considered conceptually to be comprised of short axial sections 70 having optical fiber pairs connected thereto. Each section is considered to be a separate "cylindrical member." For the sake of clarity in the figure, only one of the fibers illustrated of FIG. 3 is shown, that being fibers 40a, 40b, . . . , 40n. "Short," as used above in connection with the length of a section, is determined in terms of the expected deformation of the cylindrical member section such that the shape of the section is predictable. Thus, for example, if a section has a small uniform curvature, the relative translation "x" of a section end 72, relative to its beginning 74, equals:

$$x = L \sin \theta + R \cos \theta (1 - \cos \theta_1) \quad \text{(Equation 8)}$$

where L is the length of the section, $\theta$ is the rotation angle about the Y axis at the beginning of the section, $\theta_1$ is the difference in rotation angle between the ends of the section, and R is the radius of curvature, assuming uniform curvature, of the section in the X-Z plane.

If $\theta_1$ is small, then:

$$R = L/\theta_1 \quad \text{(Equation 9)}$$

and, if $\theta$ is also small, then the relative displacement for the nth section will be:

$$X_n = L\theta_{n-1} + L\theta_{1n}/2 \quad \text{(Equation 10)}$$

where $\theta_{n-1}$ equals:

$$\theta_{n-1} = \sum_{m=1}^{n-1} \theta_m \quad \text{(Equation 11)}$$

If the cylindrical member has a total length E and is considered to be divided into k uniform sections of length L, then the total displacement $D_x$ at the end of the section is given by:

$$D_x = \sum_{n=1}^{k} x_n \quad \text{(Equation 12)}$$

or $$D_x = L \sum_{n=1}^{k} \left[ \left( \sum_{m=1}^{n-1} \theta_m \right) + \theta_n/2 \right]$$

or $$D_x = (E/k) \sum_{n=1}^{k} (k - \tfrac{1}{2} + n) \theta_n$$

Accordingly, the total displacement $D_x$ can be measured in terms of the number of fringes observed from each fiber pair 40a, 42a; 40b, 42b, ... This, however, is a cumbersome approach to the translation measurement problem.

Figure 9:
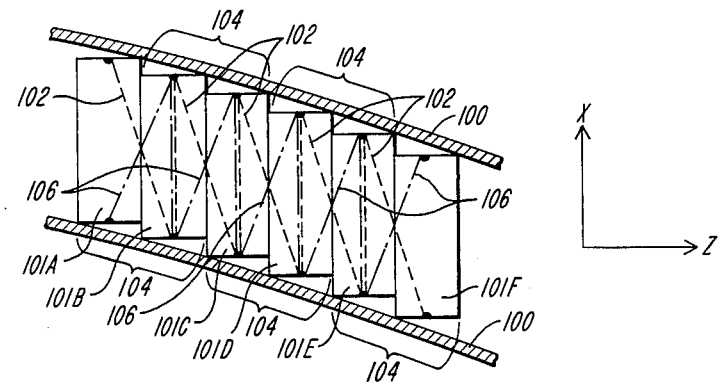
FIG. 9 is a schematic representation of an alternate X and Y translation measurement apparatus in accordance with a particular preferred embodiment of the invention.
Figure 10:
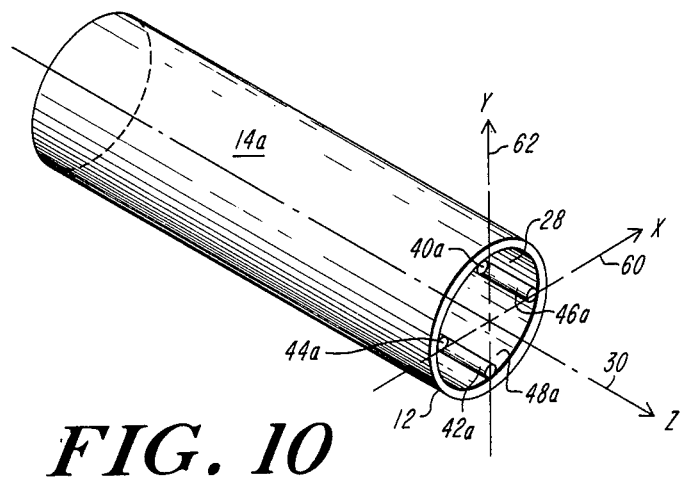
FIG. 10 is an alternate embodiment of the apparatus of FIG. 3 wherein the elongated elements are adhered to an inside surface of a hollow cylindrical member.

Alternatively, therefore, referring to FIG. 9, for translations in the X and Y directions, a hollow cylindrical member 100 can be employed to internally support an array of flat rings 101A–101F stacked against each other. These rings may slide against each other but may not rotate independently. Each section 104 includes two or more rings. Each section 104 also includes at least two pairs of optical fibers, one pair for the X direction and one pair for the Y direction. For measurement in each of the X and Y directions, the fibers of one pair are stretched from the interior face of the ring at one end of section 104 to the interior face of the ring at the other end of section 104 at diametrically opposed locations so that the diagonal fiber sections for each pair would lie in the respective one of the X-Z and Y-Z planes, respectively, when the hollow cylindrical member is not deformed. FIG. 9 depicts a cross-section view of the member 100, along the X-Z plane, showing the fiber sections 102 (with dot-dash lines) and 106 (with dash-dot lines) for each of sections 104. The corresponding fiber sections for measurement of translation in the Y direction are similarly arranged in the Y-Z plane, but are omitted for clarity from FIG. 9.

With the configuration of FIG. 9, translation of one face of a section 104 in the X direction, by an amount x, would result in one X-Z diagonal fiber section (e.g. fiber section 106) extending, and the other X-Z diagonal fiber section (e.g. fiber section 102) corresponding thereto, shortening. For a slender section, the differential length "a" between diagonal fibers of the pair would be, to first order:

$$a = 2dx/L \quad \text{(Equation 13)}$$

In terms of the number of fringes, N, the relation is:

$$x = LwN/2d \quad \text{(Equation 14)}$$

Referring to FIG. 9, then, the total length E of the hollow cylindrical member can be broken into a number, k, of sections, each of length $L_n$. In one preferred embodiment of the invention, the optical fiber can be continuous for the entire length of the cylindrical member by following a zigzagging path down the tube. In accordance with this embodiment of the invention, the sections act as parallelograms with sides of fixed length and the "jogs" from one side of the tube to the other act like connections between hinged joints. In accordance with this embodiment of the invention, the total displacement at the end of the cylindrical member is given by:

$$x = (w/2d) \sum_{n=1}^{k} L_n N_n \quad \text{(Equation 15)}$$

If slender sections employed are of uniform length L and the cylindrical member contains k sections, then Equation 15 reduces to:

$$x = (Ew/2kd) \sum_{n=1}^{k} L_n N_n \quad \text{(Equation 16)}$$

or $$x = (Ew/2kd) N_x \quad \text{(Equation 17)}$$

where $N_x$ equals the number of fringes detected between the diagonal fiber pair corresponding to the selected axis, here the X axis. As the number of sections is increased beyond the "slender" characteristic, the sensitivity of the measuring apparatus approaches:

$$x = Nw/2 \quad \text{(Equation 18)}$$

This is the same sensitivity as defined for the z displacement in Equation 7.

If the diagonally placed fibers are set at 45° to the Z axis, that is the section is no longer "slender," then:

$$x = Nw/\sqrt{2} \quad \text{(Equation 19)}$$

Thus, the configuration of FIG. 9 provides a measurement of X or Y translation without requiring, if single fibers extend continuously for the entire length of the cylindrical member, measurement of a plurality of separate interference fringe patterns. The various embodiments shown above therefore provide a method and apparatus for measuring each of the six degrees of freedom illustrated in FIG. 2 by a combination, for example, of the constructions illustrated and described in connection with FIGS. 3, 6, and 9.

Additions, subtractions, deletions and other modifications of the particular embodiments of the invention will be obvious to those skilled in the art and are within the scope of the following claims.

What is claimed is:

1. Apparatus for measuring the relative rotation of one end of a cylinder member comprising
   a first strain sensitive parametric element,
   a second strain-sensitive parametric element,
   a second strain-sensitive parametric element, means for adhering at least one of said parametric elements along the length of said cylindrical member,
   means for applying an interrogating source signal at at least an interrogation end of each of said first and second elongated parametric elements,
   means for measuring a source signal parameter differentially affected by relative rotation of said one end of said cylindrical member, and
   means for determining from said measured source parameter said relative rotation of said one end in at least one degree of freedom.

2. The apparatus of claim 1 wherein
   said first and second strain-sensitive, parametric elements are each electrically conductive, strain-sensitive wire elements, and said measuring means comprises means for measuring the resistance of each of said wire elements.

3. The apparatus of claim 1 further wherein said first and second parametric elements are each optical fibers,
   said applying means comprises
      a laser source, and
      means for directing said laser source output onto the interrogation ends of each of said first and second optical fibers, and
   said measuring means comprises
      means for measuring an optical interference pattern resulting from light emanating from an exit end of each of said optical fibers.

4. The apparatus of claim 3 further comprising
   means for affixing first and second portions of said optical fibers along the length of said cylindrical member at the intersection of an axially extending surface of the cylindrical member and a first plane extending through a longitudinal axis of the cylindrical member.

5. The apparatus of claim 4 wherein said surface is an outside surface of said cylindrical member.

6. The apparatus of claim 4 wherein
   said cylindrical member is hollow, and
   said surface is an inside surface of said cylindrical member.

7. The apparatus of claim 4 further comprising
   a second pair of single mode optical fibers, and
   means for affixing a first and a second portion of said second pair of single mode optical fibers to the cylindrical member at an intersection of the axially extending surface of the cylindrical member and a plane normal to said first plane and passing through the axis of the cylindrical member.

8. The apparatus of claim 7 wherein said surface is an outside surface of said cylindrical member.

9. The apparatus of claim 7 wherein
   said cylindrical member is hollow, and
   said surface is an inside surface of said cylindrical member.

10. The apparatus of claim 3 further wherein said adhering means comprises means for adhering said optical fibers to said cylindrical member surface in a non-movable fixed relationship.

11. Apparatus for measuring the relative movement of one end of a cylindrical member comprising:
   first and second strain-sensitive optical fibers,
   means for affixing first and second portions of said optical fibers along the length of said cylindrical member at the intersection of an axially extending surface of the cylindrical member and as first plane extending through a longitudinal axis of the cylindrical member,
   a second pair of single mode optical fibers,
   means for affixing a first and a second portion of said second pair of single mode optical fibers to the cylindrical member at an intersection of the axially extending surface of the cylindrical and a plane normal to said first plane and passing through the axis of the cylindrical member,
   a third pair of single mode optical fibers,
   means for adhering first and second single mode optical fibers of said third pair of fibers in a helical, counter-wound, relationship to one another about said cylindrical member,
   means for applying an interrogating source signal to at least an interrogation end of each of said first and second optical fibers, said applying means including a laser source and means for directing said laser source output onto the interrogation ends of each of said first and second optical fibers,
   means for measuring a source signal parameter differentially affected by a selected movement of said one end of said cylindrical member, said measuring means including means for measuring an optical interference pattern resulting from light emanating from an exit end of each of said optical fibers, and
   means for determining from said measured source parameter said relative movement of said one end in at least one degree of freedom,
   wherein said measuring means and said determining means measure rotation of the one end of the cylindrical member about the longitudinal axis of the cylindrical member.

12. Apparatus for measuring the relative movement of one end of a cylindrical member comprising
   a first strain-sensitive parametric element, said element being an optical fiber,
   a second strain-sensitive parametric element, said element being an optical fiber,
   means for adhering at least one of said parametric elements along the length of said cylindrical member, said adhering means including means for adhering a plurality of single mode fiber optic elements along diametrically opposed locations on a longitudinally extending surface of the cylindrical member at the intersection of said surface and a plane passing through the axis of the cylindrical member, each of said plurality of fiber optical elements being connected for a short section only along the length of the cylindrical member, said short sections together comprising substantially the entire length of said cylindrical member,
   means for applying an interrogating source signal at at least an interrogation end of each of said first and second elongated parametric elements, said applying means comprising a laser source, and means for directing said laser source output onto the interrogation ends of each of said first and second optical fibers,
   means for measuring a source signal parameter differentially affected by a selected movement of said one end of said cylindrical member, said measuring means comprising means for measuring an optical interference pattern resulting from light emanating from an exit end of each of said optical fibers, and
   means for determining from said measured source parameter said relative movement of said one end in at least one degree of freedom,
   wherein said measuring means and said determining means measure a translation movement of said one end of the cylindrical member relative to its other end.

13. The apparatus of claim 12 wherein said measuring means further comprises
   means for measuring an optical interference pattern resulting from light emanating from an exit end of each of said plurality of single mode fiber optic elements, and
   said applying means comprises means for directing said laser source output onto the interrogation end of each of said plurality of single mode fiber optic elements.

14. The apparatus of claim 13 further wherein
   said determining means comprises means responsive to the measured optical interference pattern of each of said single mode fiber optic corresponding elements for determining said relative translational movement of said one end of the cylindrical member relative to the other end thereof.

15. Apparatus for measuring the relative movement of one end of a hollow cylindrical member comprising
   a first strain-sensitive parametric element, said element being an optical fiber
   a second strain-sensitive parametric element, said element being an optical fiber
   means for adhering at least one of said parametric elements along the length of said cylindrical member,
   means for applying an interrogating source signal at at least an interrogation end of each of said first and second elongated parametric elements, said applying means comprising a laser source, and means for directing said laser source output onto the interrogation ends of each of said first and second optical fibers,
   means for measuring a source signal parameter differentially affected by a selected movement of said one end of said cylindrical member, said measuring means comprising means for measuring an optical interference pattern resulting from light emanating from an exit end of each of said optical fibers,
   means for determining from said measured source parameter said relative movement of said one end in at least one degree of freedom, and
   means for adhering continuous, diametrically zigzagging single mode optical fibers on an inside surface of the cylindrical member for determining a translational movement of said one end of the cylindrical member relative to the other end thereof.

16. The apparatus of claim 15 further wherein said adhering means comprises
   means for zigzagging said optical fibers for providing uniform length sections of said cylindrical member, each said section being short relative to a diameter of said cylindrical member.

17. The apparatus of claim 16 wherein said adhering means comprises
   means for zigzagging said single mode optical fibers at an angle of 45° to a longitudinal Z axis for each section of said cylindrical member.

18. Apparatus for measuring the relative movement of one end of a cylindrical member comprising
   a first strain-sensitive parametric element, said first element being an optical fiber,
   a second strain-sensitive parametric element, said second element being an optical fiber,
   means for adhering at least one of said parametric elements along the length of said cylindrical member, wherein said adhering means comprises means for causing a plurality of passes of each said single mode optical fiber along substantially an entire length of said cylindrical member for increasing the sensitivity of said apparatus to movement of said one relative to the other end,
   means for applying an interrogating source signal at at least an interrogation end of each of said first and second elongated parametric elements, said applying means comprising a laser source, and means for directing said laser source output onto the interrogation ends of each of said first and second optical fibers,
   means for measuring a source signal parameter differentially affected by a selected movement of said one end of said cylindrical member, said measuring means comprising means for measuring an optical interference pattern resulting from light emanating from an exit end of each of said optical fibers, and
   means for determining from said measured source parameter said relative movement of said one end in at least one degree of freedom.

19. Apparatus for measuring the relative movement of one end of a cylindrical member comprising
   a first strain-sensitive parametric element, said element being a first optical fiber,
   a second strain-sensitive parametric element, said element being a second optical fiber,
   means for applying an interrogating source signal at at least an interrogation end of each of said first and second parametric elements, said applying means comprising a laser source, and means for directing said laser source output onto the interrogation ends of each of the first and second optical fibers,
   means for adhering at least one of said parametric elements along the length of said cylindrical member, said adhering means comprising means for adhering said first and second optical fibers in a helical, counter-wound relationship to one another about said cylindrical member,
   means for measuring a source signal parameter differentially affected by a selected movement of said one end of said cylindrical member, said measuring means comprising means for measuring an optical interference pattern resulting from light emanating from an exit end of each of the optical fibers, and
   means for determining from said measured source parameter said relative movement of said one end in at least one degree of freedom,
   wherein said measuring means and said determining means measure rotation of the one end of the cylindrical member about the longitudinal axis of the cylindrical member about the longitudinal axis of the cylindrical members.

20. A method for measuring relative rotation of one end of a cylindrical member comprising the steps of
   fastening portions of a first and a second single mode optical fiber respectively to different portions of a longitudinal surface of the cylindrical member,
   transmitting coherent laser light through the length of the optical fibers from first ends thereof to second ends thereof,
   positioning said second end of each of the optical fibers in close proximity to each other so that coherent light emanating therefrom produces an optical interference pattern, and
   using said optical interference pattern to determine the relative rotation of said one end of the cylindrical member.

21. The method of claim 20 further comprising the step of
   affixing said first and second portions of said optical fibers along the length of said cylindrical member at the intersection of an axially extending surface of the cylindrical member and a first plane passing through the longitudinal axis of said cylindrical member.

22. The method of claim 21 further comprising the step of
   affixing a first and a second portion of a second pair of single mode optical fibers to said cylindrical member at the intersection of the axially extending surface of said cylindrical member and a second plane normal to said first plane and passing through the axis of said cylindrical member.

23. The method of claim 21 further comprising the step of
affixing said first and second portions of said optical fibers to an axially extending outside surface of said cylindrical member.

24. The method of claim 23 further comprising the step of
affixing said first and second portions of a second pair of optical fibers to said axially extending outside surface of said cylindrical member.

25. The method of claim 21 further comprising the step of
affixing said first and second portions of said optical fibers along an inside, axially extending surface of said cylindrical member.

26. The method of claim 26 further comprising the step of
affixing said first and second portions of a second pair of optical fibers along said axially extending inside surface of the cylindrical member.

27. A method for measuring relative movement of one end of a cylindrical member comprising the steps of
affixing first and second portions of first and second optical fibers along the length of said cylindrical member at the intersection of an axially extending surface of the cylindrical member and a first plane passing through the longitudinal axis of said cylindrical member,
transmitting coherent laser light through the length of said first and second optical fibers from first ends thereof to second ends thereof,
positioning said second end of each of said first and second optical fibers in close proximity to each other so that coherent light emanating therefrom produces an optical interference pattern,
using said optical interference pattern to determine the relative movement of said one end of the cylindrical member,
affixing a first and a second portion of a second pair of a single mode optical fibers to said cylindrical member at the intersection of the axially extending surface of said cylindrical member and a second plane normal to the said first plane and passing through the axis of the said cylindrical member,
adhering first and second optical fibers of a third pair of single mode optical fibers in a helical counter-wound relationship to one another about said cylindrical surface, and
measuring the rotation of said one end of said cylindrical member about the axis of the cylindrical member.

28. A method for measuring relative movement of one end of a cylindrical member comprising the steps of
fastening portions of a first and a second single mode optical fiber respectively to different portions of a longitudinal surface of the cylindrical member,
transmitting coherent laser light through the length of the optical fibers from first ends thereof to second ends thereof,
positioning said second end of each of the optical fibers in close proximity to each other so that coherent light emanating therefrom produces an optical interference pattern,
using said optical interference pattern to determine the relative movement of said one end of the cylindrical member,
adhering a plurality of single mode optical fiber elements along diametrically opposed surface locations of the cylindrical member at the intersection of a longitudinally extending surface of the cylindrical member and a plane passing through the longitudinal axis of said cylindrical member, each of said plurality of fiber optical elements being connected for a short section only of the length of said cylindrical member and together said plurality of fiber elements covering the length of said cylindrical member, and
measuring, using said fiber elements, a translation distance of said one end of said cylindrical member relative to the other end thereof.

29. A method for measuring relative movement of one end of a cylindrical member comprising the steps of
fastening portions of a first and a second single mode optical fiber respectively to different portions of a longitudinal surface of the cylindrical member,
transmitting coherent laser light through the length of the optical fibers from first ends thereof to seconds ends thereof,
positioning said second end of each of the optical fibers in close proximity to each other so that coherent light emanating therefrom produces an optical interference pattern,
using said optical interference pattern to determine the relative movement of said one end of the cylindrical member, and
adhering diametrically zigzagging optical fibers on an inside surface of a hollow cylindrical member for determining a translation movement of said one end of said cylindrical member relative to said other end thereof.

30. A method for measuring the relative rotation of one end of a cylindrical member comprising the steps of
adhering at least one a first and second strain-sensitive, parametric element along the length of said cylindrical member,
applying an interrogating source signal at at least an interrogation end of each of the first and second parametric elements,
measuring a source signal parameter differentially affected by a selected rotation of said one end of said cylindrical member, and
determining form the measured source parameter the relative rotation of the one end in at least one degree of freedom.

31. The method of claim 30 further wherein each said strain-sensitive, parametric elements is an electrically conductive, strain-sensitive wire element whose resistance changes with strain.

32. The method of claim 30 wherein each of said first and second strain-sensitive, parametric elements is a single mode optical fiber.

* * * * *